Dec. 14, 1954  H. T. MADSEN  2,696,924
BALE LOADER FOR VEHICLES
Filed March 6, 1953  2 Sheets-Sheet 1

INVENTOR.
Holger T. Madsen,
BY
McMorrow, Berman + Davidson
ATTORNEYS

Dec. 14, 1954 H. T. MADSEN 2,696,924
BALE LOADER FOR VEHICLES
Filed March 6, 1953 2 Sheets-Sheet 2
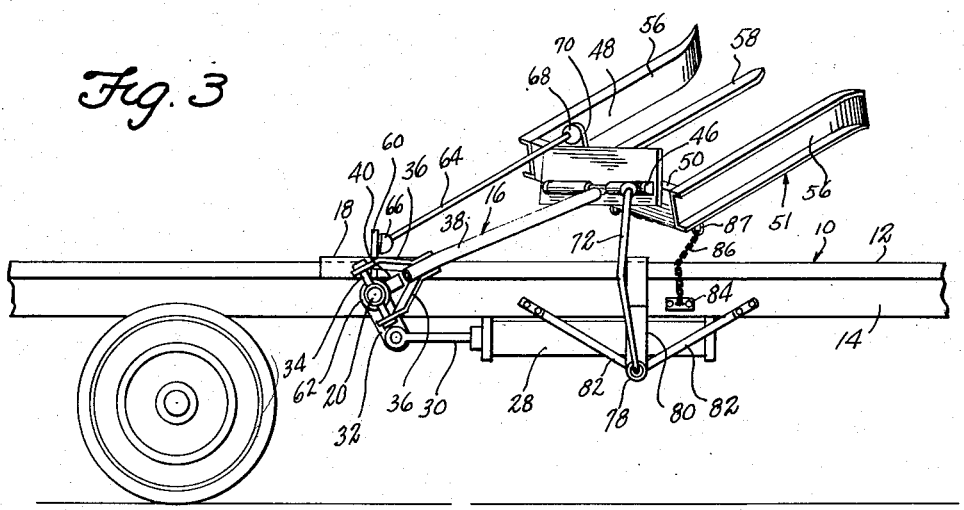
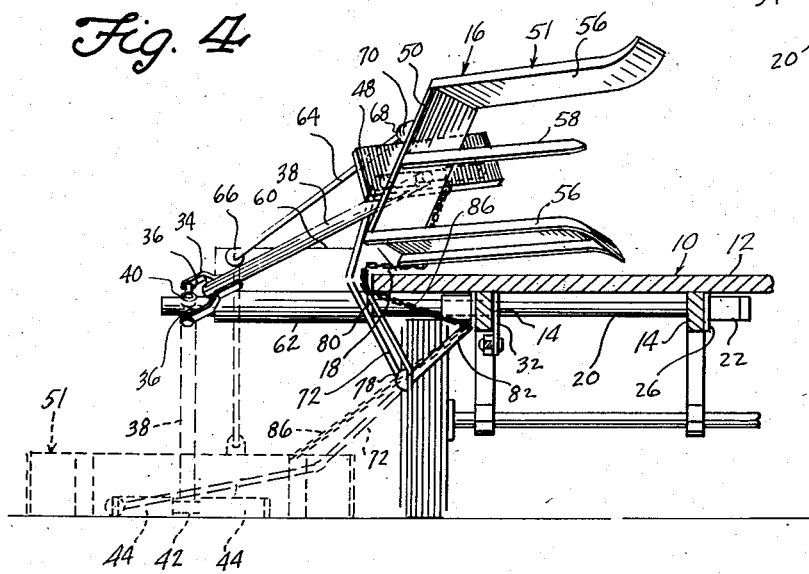
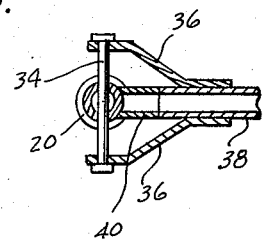
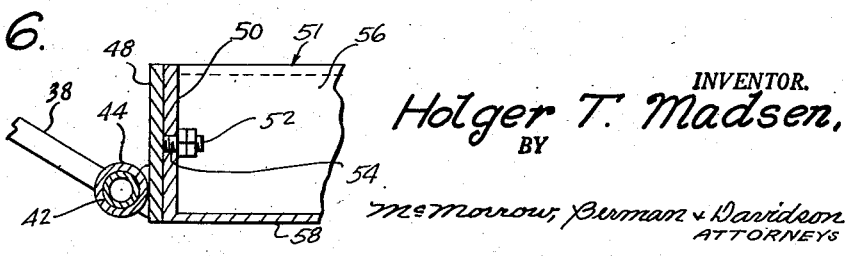
INVENTOR.
Holger T. Madsen,
BY
McMorrow, Berman & Davidson
ATTORNEYS United States Patent Office 2,696,924
Patented Dec. 14, 1954

2,696,924

BALE LOADER FOR VEHICLES

Holger T. Madsen, Emmett, Idaho

Application March 6, 1953, Serial No. 340,739

2 Claims. (Cl. 214—80)

This invention relates to apparatus mountable on a vehicle which, when the vehicle moves alongside a bale, will lift the bale from the ground and will deposit it on the vehicle.

The main object of the invention is to provide hydraulically operated bale loading apparatus which will include a lifting basket that normally slides along the ground surface and is adapted to move into supporting relationship to a bale, said lifting basket being connected to the associated vehicle by a novel linkage which swings the basket upwardly to a height greater than that of the load support platform or bed of the vehicle, moves the basket laterally toward said platform until it is over the platform location at which the supported bale is to be dropped, and then inverts the basket to cause the bale to fall therefrom onto said platform.

Other objects are to provide apparatus of the type stated that will be inexpensive; substantially trouble free and sure in operation; mountable with considerable ease and facility on a conventionally designed vehicle such as a tractor-drawn, flat bed wagon; mountable on said vehicle without requiring modification or redesign of the vehicle; and attachable to the platform without taking up any space thereon that might otherwise be used for supporting loaded bales.

Other objects will appear from the following description, the claims appended thereto, and from the annexed drawings, in which like reference characters designate like parts throughout the several views, and wherein:

Figure 3 is a view similar to Figure 1 in which the lifting basket has been elevated to a height higher than the load support platform of the wagon, but has not yet been inverted;

Figure 4 is a transverse sectional view through the wagon, said wagon being illustrated fragmentarily, the apparatus constituting the present invention being viewed from the right of Figure 3 and the basket being inverted, the dotted lines showing the initial, normal position of the apparatus, taken substantially on line 4—4 of Figure 2;

Figure 5 is an enlarged, fragmentary, sectional view showing the connection of the basket lift arm to a rotary actuating shaft; and Figure 6 is an enlarged, detail sectional view taken substantially on line 6—6 of Figure 2.

Figures 1, 2:
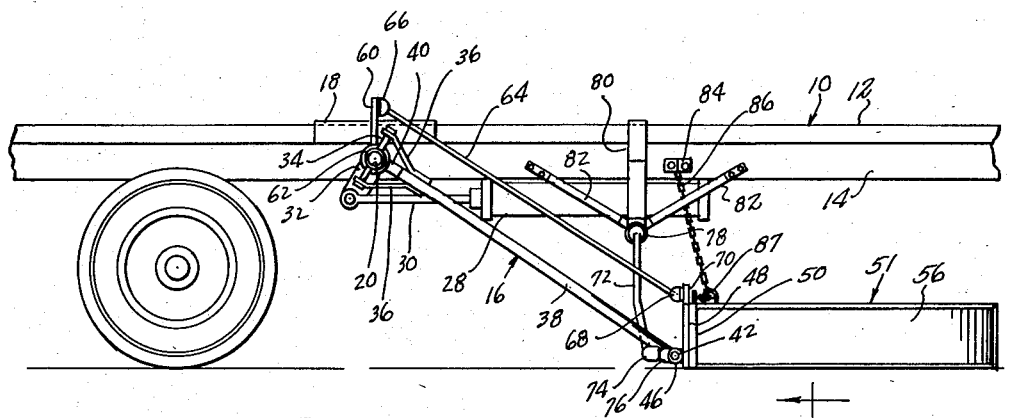
Figure 1 is a side elevational view of the apparatus as it appears prior to engaging a bale, the apparatus being mounted on a tractor-drawn wagon, said wagon being shown fragmentarily and in side elevation.
Figure 2 is a top plan view in which the wagon has been illustrated fragmentarily and in top plan.

Designated generally at 10 is a wagon having a flat load support platform 12 mounted on parallel, longitudinally extended sills 14. My loader is designated generally at 16 and includes an angle iron support bracket 18 bolted to one longitudinal edge of platform 12.

A rotary actuating shaft 20, extending transversely of and below platform 12, is journaled in bearing openings formed in sills 14, said bearing openings being aligned transversely of the platform. The outer end of the shaft 20 projects laterally and outwardly from the platform, below bracket 18.

On the inner end of shaft 20, a collar 22 is fixedly mounted, a collar 24 being fixedly mounted on the midlength portion of said shaft and cooperating with collar 22 to prevent endwise movement of shaft 20. The collars engage against bearing plates 26 bolted to the respective sills and apertured for passage of shaft 20 therethrough.

Means for rotating the shaft 20 in opposite directions includes a hydraulic cylinder 28 secured to and arranged longitudinally of one of the sills 14. Cylinder 28 is of the double-acting type, and is actuated from the hydraulic pump on the tractor or other draft vehicle, not shown.

A piston rod 30 projects from the piston and can be either extended out of or retracted into the cylinder. The outer end of rod 30 is pivotally connected to the outer end of a crank arm 32 rigid at its inner end with shaft 20. It will be understood that the pin pivotally connecting rod 30 and crank arm 32 will extend through a slot formed in the crank arm to afford a connection that will permit straight line movement of rod 30 to be translated into swinging movement of the crank arm. Alternatively, the cylinder 28 could be pivoted upon, rather than fixedly connected to, sill 14.

Therefore, when rod 30 is forced out of cylinder 28, it will rotate shaft 20 in one direction. Retraction of the rod will rotate shaft 20 in an opposite direction.

Referring to Figure 5, in the outer end of the shaft 20, a connecting pin 34 is mounted. Pin 34 is arranged diametrically of the shaft 20 and has its opposite ends projecting radially and outwardly of the shaft in opposite directions. The pin is extended, at its ends, through aligned openings formed in the widely spaced ends of yoke arms 36 converging in a direction away from shaft 20 and fixedly secured, at their convergent ends, to the inner end of an elongated, tubular, straight basket lift arm 38.

The yoke arms 36 are rotatable upon pin 34. Therefore, arm 38 is universally connected to shaft 20, and is not only swingable upwardly and downwardly on rotation of the shaft, but also swings laterally toward and away from platform 12 (see Figure 4).

Normally, arm 38, in its inoperative position shown in Figures 1, and 4 (dotted lines), is perpendicular to the axis of rotation of the shaft 20. In this position of the basket lift arm, it is abutted against and is aligned coaxially with a stub 40 fixed to and extending radially from the shaft 20.

At its outer end, the basket lift arm 38 is rigid with the midlength portion of a tubular hinge pin 42 disposed transversely of said arm and journaled at its ends in coaxial, open ended hinge sleeves 44. Endwise movement of the hinge pin 42 in the sleeves 44 is prevented by stop collars 46 circumposed about and fixedly connected to the ends of the hinge pin, said ends of the hinge pin projecting out of the outer ends of the hinge sleeves, with the collars 46 abutting against said outer ends of the hinge sleeves.

The hinge sleeves 44 are welded to the outer surface of a flat, rectangular basket support plate 48, along the lower longitudinal edge of said plate. Plate 48 is positioned flat against the outer surface of the plate-like bight 50 of a U-shaped lift basket 51. Basket 51 is connected to plate 48 for rotation about a horizontal axis or stud 52 fixed to and projecting laterally from the inner surface of plate 48, said stud extending through a center opening 54 of the bight 50 and being extended normally to the hinge axis defined by hinge pin 42.

Rigid with the respective ends of bight 50, and projecting forwardly from said bight, are basket arms 56 the free ends of which are curved outwardly, said arms 56 diverging in a direction away from bight 50, thereby to insure their embracing between them a bale to be lifted. A bale support finger 58 is fixedly connected at its inner end to the midlength portion of bight 50, at the lower edge of the bight. Finger 58 is formed from an elongated, relatively narrow length of flat bar material, and is pointed at its free end. The arms 56 of the basket project a substantial distance above the finger 58, thus to engage opposite sides of a bale supported on the finger and stabilize said bale on the basket while the bale is being loaded with the apparatus.

An elongated rod 64 extends parallel to and above the basket lift arm 38, and is spaced laterally of arm 38, in the direction of platform 12, as best shown in Figure 2. Rod 64 is connected by a universal joint 66, at one end, to a flat, upstanding rod support plate 60 made rigid along its bottom edge to a stationary tube 62 through which the projecting portion of shaft 20 extends. Tube 62 and plate 60 are welded to the bracket 18.

At its outer end, rod 64 is connected by a universal joint 68 to an upwardly projecting ear 70 rigid with and extending upwardly from the top edge of the basket support plate 48. The rod 64 and the basket lift arm 38 thus form a parallelogram linkage that will hold the lift basket 51 substantially horizontal during the loading operation, thereby to prevent the basket from tilting downwardly at its free or open end in a manner that would cause the bale to drop off the basket before the bale is loaded into the wagon.

A stabilizer rod support bracket 80 is bolted to platform 12 forwardly of bracket 18, to connect to the platform the inner end of a stabilizer rod 72. The rod 72, as shown in Figure 4, is of angular formation, said rod being bent at a location disposed substantially medially between its ends in such a manner as to cause the respective end portions of the stabilizer rod to be disposed at a wide obtuse angle to one another.

At its outer end, the stabilizer rod 72 is connected by a universal joint 74 to a laterally projected lug 76 rigid with that collar 46 that is remote from the wagon.

At its inner end, the universal connection 78 is employed to connect the stabilizer rod 72 to the lower end of the depending stabilizer rod support bracket 80. The rod 72, as will be noted from Figure 2, projects laterally and outwardly from the platform 12, so as to be disposed substantially crosswise of the basket lift arm 38. The outer end portion of rod 72 extends below the basket lift arm 38, with the universal connection 74 being disposed adjacent the outer side of the basket 51.

To rigidify the bracket 80, braces 82 are connected to the depending end of said bracket, and to the adjacent sill 14 of the wagon.

Connected to said adjacent sill 14 is a small plate 84, and attached to said plate is one end of a flexible element such as a chain 86. The chain is extended intermediate its ends through an eye 87 carried by the inner side of basket 51, and is attached at its other end to an eye 88 carried by the upper edge of bight 50, medially between the ends of said bight. The arrangement is such that the chain will be held substantially taut when the basket is in the normal, ground-engaging position thereof shown in Figure 1.

In use of the apparatus, the wagon 12 will be drawn along one side of a row of bales spaced apart from one another along the ground surface. The basket 51 slides along or is disposed close to said ground surface, and as a result, the finger 58, when a bale is reached, will slide under said bale, with the bale being embraced between the side arms 56 of the basket.

The hydraulic mechanism is now applied to cause retraction of piston rod 30. As a result, the shaft 20 will be rotated counterclockwise in Figure 1, and this will cause the basket lift arm 38 to swing upwardly. The supported bale will thus be lifted off the ground.

Upward swinging movement of the basket will cause said basket to be swung laterally toward the platform 12, until it is directly over the platform. This result will be obtained because the outer end of the stabilizer rod 72, swinging upwardly in a vertical plane normal to the vertical plane of swinging movement of the basket lift arm 38, will travel in an arcuate path, toward the platform 12. The basket 51 will thus be carried inwardly to a position over said platform.

As the basket swings over the platform, the chain 86 will move to the position thereof shown in full lines in Figure 4, and will be engaged by the edge of the platform 12, at a location intermediate opposite ends of said chain. This will cause the chain to pull downwardly on the inner side of the basket 51, simultaneously with movement of the basket to a position directly over the platform 12. The basket will thus be pivoted about the axis of stud 52, and will be inverted to an extent sufficient to cause the supported bale to fall therefrom onto the platform 12. In this position of the parts, they appear as shown in full lines in Figure 4, and also as shown in Figure 3.

When the bale has dropped onto the platform 12, it can be stacked elsewhere on the platform by a worker.

The hydraulic mechanism is now reversed, so as to cause extension of rod 30 relative to its associated cylinder 28. This will cause the shaft 20 to be rotated in a clockwise direction. The basket will thus be swung downwardly and outwardly away from the platform, returning to its normal position shown in Figure 1.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A bale loader, comprising, in combination with the platform of a vehicle, a lift basket for a bale to be loaded; a basket support plate on which said basket is tiltably mounted for rotation about a horizontal axis; a basket lift arm connected hingedly at one end to said basket support plate and normally extending longitudinally of the platform in laterally spaced relation to the platform; means pivotally connecting said basket lift arm at its other end to said platform at one side of the platform, said arm having both up and down and lateral swinging movement on said means so as to shift said basket between opposite extreme positions, in one of which it will move under a ground-supported bale to engage the same and in the other of which it is elevated above the platform; a stabilizer rod extending transversely of the platform and basket lift arm and connected pivotally at its opposite ends to the platform and basket support plate respectively, for swinging the basket laterally with the basket lift arm on up and down movement of said arm; means on said vehicle for imparting up and down movement to said basket lift arm; and means extending between the basket and platform arranged to substantially invert the basket in its elevated position responsive to lateral movement of the basket lift arm toward the platform, for dropping of the bale off the basket onto the platform, said last-named means including a flexible element connected at its ends to the platform and one side of the basket respectively, said flexible element being engageable by said side of the platform on movement of the basket to the second-named extreme position thereof, thereby to tilt the basket upon the basket support plate.

2. A bale loader, comprising, in combination with a platform of a vehicle, a lift basket for a bale to be loaded, said basket being of a U-shape with a finger projecting from the bight thereof to extend under a ground-supported bale; a basket support plate on which said basket is tiltably mounted; a basket lift arm connected hingedly at one end to said basket support plate and normally extending longitudinally of the platform in laterally spaced relation to the platform; means pivotally connecting said basket lift arm at its other end to said platform at one side of the platform, said arm having both up and down and lateral swinging movement on said means so as to shift said basket between opposite extreme positions, in one of which it will move under a ground-supported bale to engage the same and in the other of which it is elevated above the platform; a stabilizer rod extending transversely of the platform and basket lift arm and connected pivotally at its opposite ends to the platform and basket support plate respectively, for swinging the basket laterally with the basket lift arm on up and down movement of said arm; means extending between the basket and platform arranged to substantially invert the basket in its elevated position responsive to lateral movement of the basket lift arm toward the platform, for dropping of the bale off the basket onto the platform, said last-named means including a flexible element connected at its ends to the platform and one side of the basket respectively, said flexible element being engageable by said side of the platform on movement of the basket to the second-named extreme position thereof, thereby to tilt the basket upon the basket support plate; and means on said vehicle for imparting up and down movement to said basket lift arm.

References Cited in the file of this patent

UNITED STATES PATENTS

| Number | Name | Date |
|---|---|---|
| 1,327,834 | Long | Jan. 13, 1920 |
| 2,182,838 | Bennett | Dec. 12, 1939 |
| 2,228,447 | Evelev | Jan. 14, 1941 |
| 2,321,630 | Shippee | June 15, 1943 |
| 2,491,079 | Bestland | Dec. 13, 1949 |
| 2,634,003 | Williamson et al. | Apr. 7, 1953 |
| 2,656,058 | Foote | Oct. 20, 1953 |